United States Patent Office 3,662,003
Patented May 9, 1972

3,662,003
POLYALKYLENEGLYCOL ETHERS OF BIS-
(HYDROXYALKYL)-SULFIDES
Wilfried Umbach, Langenfeld, Rhineland, Rainer Mehren,
Neuss, Rhineland, Werner Stein, Erkrath-Unterbach,
Rhineland, and Ernst Gott, Ratingen-Tiefenbroich,
Rhineland, Germany, assignors to Henkel & Cie
GmbH, Dusseldorf-Holthausen, Germany
No Drawing. Filed Oct. 2, 1969, Ser. No. 863,352
Claims priority, application Germany, Oct. 9, 1968,
P 18 01 951.7
Int. Cl. C07c 149/18
U.S. Cl. 260—609 R       4 Claims

ABSTRACT OF THE DISCLOSURE

Polyalkyleneglycol ethers of bis(hydroxyalkyl)-sulfides having the formula

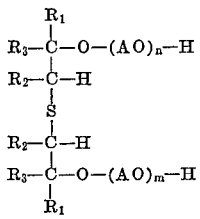

wherein $R_1$ is an alkyl having from 1 to 22 carbon atoms, $R_2$ and $R_3$ are members selected from the group consisting of hydrogen and alkyl having from 1 to 21 carbon atoms, with the proviso that the sum of the carbon atoms in each set of $R_1$, $R_2$ and $R_3$ is from 4 to 22, A is a bivalent member having from 2 to 4 carbon atoms selected from the group consisting of alkylene, haloalkylene and hydroxyalkylene, $n$ and $m$ represent integers from 0 to 100 with the proviso that the sum of $n$ and $m$ is an integer from 1 to 100. The compounds have surface active properties and are useful per se or as intermediates.

OBJECTS OF THE INVENTION

An object of the present invention is the obtaining of novel polyalkyleneglycol ethers of bis-(hydroxyalkyl)-sulfides having the formula

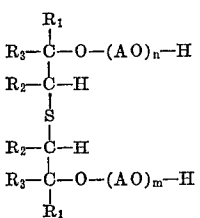

wherein $R_1$ is an alkyl having from 1 to 22 carbon atoms, $R_2$ and $R_3$ are members selected from the group consisting of hydrogen and alkyl having from 1 to 21 carbon atoms, with the proviso that the sum of the carbon atoms in each set of $R_1$, $R_2$ and $R_3$ is from 4 to 22, A is a bivalent member having from 2 to 4 carbon atoms selected from the group consisting of alkylene, haloalkylene and hydroxyalkylene, $n$ and $m$ represent integers from 0 to 100 with the proviso that the sum of $n$ and $m$ is an integer from 1 to 100.

Another object of the invention is the preparation of the above polyalkyleneglycol ethers of bis-(hydroxyalkyl)-sulfides.

These and other objects of the invention will become more apparent as the description thereof proceeds.

DESCRIPTION OF THE INVENTION

We have now discovered novel polyalkyleneglycol ethers of bis-(hydroxyalkyl)-sulfides having the formula

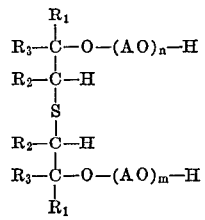

wherein $R_1$ is an alkyl having from 1 to 2 carbon atoms, $R_2$ and $R_3$ are members selected from the group consisting of hydrogen and alkyl having from 1 to 21 carbon atoms, with the proviso that the sum of the carbon atoms in each set of $R_1$, $R_2$ and $R_3$ is from 4 to 22, A is a bivalent member having from 2 to 4 carbon atoms selected from the group consisting of alkylene, haloalkylene and hydroxyalkylene, $n$ and $m$ represent integers from 0 to 100 with the proviso that the sum of $n$ and $m$ is an integer from 1 to 100. These compounds have not hitherto been known.

The alkyl residues $R_1$ and $R_2$ in the form given above may represent straight-chain and branched alkyl residues, which may also contain cyclic groupings. They may also be substituted or interrupted by hetero-atoms or heteroatom groups which do not cause splitting of an epoxide ring, for example halogen atoms or ether groups. In other words $R_1$ and $R_2$ can represent, in addition to alkyl groups, alkoxyalkyl, cycloalkylalkyl, haloalkyl, carbalkoxyalkyl. In this event, the total sum of the carbon atoms in each set of $R_1$ and $R_2$ is from 4 to 22. Preferable are those compounds under the formula where $R_2$ and $R_3$ are hydrogen, $R_1$ is an alkyl having from 6 to 16 carbon atoms, A is ethylene or propylene, and the sum of $n+m$ is from 5 to 50. Under these conditions the individual values for $n$ and $m$ will vary somewhat but each value will be approximately one-half the sum of $n$ and $m$, or integers of from 2 to 30.

The alkylene residues A may be straight or branched, or substituted by halogen or a hydroxy group.

The compounds may be prepared by reacting bis-(hydroxyalkyl)-sulfides of the formula

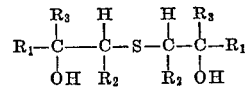

in which $R_1$, $R_2$ and $R_3$ have the above-described meanings, with epoxides containing 2 to 4 carbon atoms; for example ethylene oxide, propylene oxide, butylene oxide, epichlorhydrin and glycide. The bis-(hydroxyalkyl)-sulfides and the said epoxide may be reacted together in a molar ratio of from 1:1 to 1:100, preferably from 1:5 to 1:50. The epoxides may be added on singly, in admixture with one another or successively in any sequence to the bis-(hydroxyalkyl)-sulfides.

The reaction may be carried out by the methods customary for oxyalkylation reactions, for example, by reacting the reactants in the presence of a basic or acid catalyst at a temperature of from 0 and 200° C., at normal pressure or under increased pressure.

The bis-(hydroxyalkyl)-sulfides used as starting substances may be prepared by reacting corresponding β-hydroxyalkylmercaptans and epoxides, and also by reacting the epoxides themselves with hydrogen sulfide or by the method disclosed in the copending U.S. patent application Ser. No. 818,441, filed Apr. 22, 1969, by reacting alkane epoxides with hydrogen sulfide in the presence of a catalytic amount of strong base.

Among the bis-(hydroxyalkyl)-sulfide starting materials may be mentioned bis-(2-hydroxy-n-dodecyl)-sulfide,
bis-(2-hydroxy-n-octyl)-sulfide,
bis-(2-hydroxy-n-octadecyl)-sulfide,
bis-(2-hydroxy-n-tetracosyl)-sulfide,
bis-(2-hydroxy-2-ethyl-hexyl)-sulfide,
isomeric mixtures of bis-(2-hydroxy-1-methyl-heptyl)-sulfide, and
bis-(2-hydroxy-1-pentylpropyl)-sulfide,
bis-(2-hydroxy-3-2′-ethylhexyloxy-propyl)-sulfide,
isomeric mixture of bis-(2-hydroxy-1-7′-carbmethoxy-heptyl-decyl)-sulfide, and
bis-(2-hydroxy-1-octyl-9′-carbmethoxynonyl)-sulfide, mixture of bis-(2-hydroxyalkyl)-sulfides with mixed alkyls of from 15 to 18 carbon atoms or 12 to 16 carbon atoms, etc.

The new compounds have surface-active properties and are accordingly utilizable as wetting agents, emulsifying agents, foam regulators or detergent substances. Lower oxyalkylated products which have not sufficient solubility in water may be sulfated and therefore form starting substances for the preparation of surface-active compounds.

Those members of the new class of compounds in which the residue A of the above formula represents an ethylene group, which accordingly have been obtained by reacting bis-(hydroxyalkyl)-sulfides with ethylene oxide, are of special interest as regards their detergent properties.

When the amount of ethylene oxide added on is in the range of 5 to 50 mols of epoxide per mol of bis-(hydroxyalkyl)-sulfide, detergent substances are obtained, which are much superior in washing power to the known non-ionic surface-active compounds, for example fatty alcohol-ethylene oxide adducts, and are of particular advantage in the cleaning of chemical fibers.

In the method of preparation of the compounds according to the invention given above, products are obtained which, like those obtained in other oxyalkylation reactions, are mixtures of homologs with different degrees of alkoxylation. A separation is not generally necessary for the above-described use of the products.

The following specific embodiments are illustrative of the practice of the invention. They are, however, not to be deemed limitative in any manner.

EXAMPLE 1

26.7 gm. (0.066 mol) of bis-(2-hydroxy-n-dodecyl)-sulfide (OH value [OH and SH] 279.4, calculated 278.6, melting point 82–83° C.) were treated with 0.66 gm. of sodium methylate in an apparatus consisting of a three-necked flask, stirrer, thermometer, gas inlet frit and gas outlet arrangement. After displacing the air with nitrogen, a charging gas bomb, which contained 67.9 gm. (1.54 mols) of ethylene oxide, was connected to the apparatus. At a reaction temperature of 122° C. to 132° C. and under normal pressure, the entire amount of ethylene oxide was absorbed in the course of 9 hours. Thus, an average of 23.4 mols of ethylene oxide had been added on to one mol of bis-(2-hydroxy-n-dodecyl)-sulfide. The product contained 2.39% of sulfur (calculated value 2.24). The turbidity point of 1% aqueous solution thereof was 87–88° C.

Using this adduct at a bath ratio of 1:30 and washing liquors of various concentrations, which had been prepared with water of 16° German hardness, a "Meraklon" yarn (a polypropylene synthetic fiber) artificially soiled with standard dirt (soot-iron oxide-kaolin-synthetic skin fat) was washed at 90° C. in the launderometer for 15 minutes in each case. After the washing process, the goods were rinsed three times for 3 minutes each time with distilled water and hung up to dry. Then the remission values were measured with a Zeiss-Elrepho instrument (Filter 6) and the percentage brightening found therefrom. Before washing, the remission value of the Meraklon yarn was 29.

For comparison, analogous washing experiments were carried out using an adduct of 10 mols of ethylene oxide to a $C_{12}$–$C_{18}$ fatty alcohol mixture which is marketed under the trade name "Foryl 100." The results of the washing experiments are summarized below:

TABLE

| Surface-active compound | Grams of surface-active compound per liter | | | | | |
|---|---|---|---|---|---|---|
| | 0.5 | 1.0 | 1.5 | 2.0 | 4.0 | |
| Bis-(2-hydroxy-n-dodecyl)-sulfide plus 23.4 EO. | 42 | 61.5 | 62 | 64.5 | 64.5 | Remission value. |
| | 44 | 80 | 80.5 | 84.5 | 84.5 | Percent brightening. |
| n-$C_{12}$–$C_{18}$ fatty alcohol plus 10 EO. | 37 | 50 | 56 | 57 | 60 | Remission value. |
| | 33 | 60.5 | 71 | 73 | 77 | Percent brightening. |

NOTE.—EO=Ethylene oxide mols.

The compound according to the invention is therefore distinctly superior in its washing power for soiled "Meraklon" to the commercial product "Foryl 100," which is said to be specially suitable for cleaning synthetic fibers.

EXAMPLE 2

In a procedure according to Example 1, 420.8 gm. (0.8 mol) of a mixture of bis-(2-hydroxyalkyl)-sulfides with alkyl radicals of $C_{15}$ to $C_{18}$ chain length (OH-number [OH+SH]=212.9) were reacted with 704.0 gm. (16 mols) of ethylene oxide in the presence of 2.7 gm. of sodium methylate. The amount of ethylene oxide applied was taken up during 7½ hours. The resulting product contained on an average 20 mols of ethylene oxide per mol of bis-(2-hydroxyalkyl)-sulfide. The sulfur content of the product was 2.7%. The turbidity point of a 1% aqueous solution of the product was approximately 50° C. The product has tensile properties and is especially suited for the washing of cotton and polyester fibers.

EXAMPLE 3

Analogous to Example 1, 428.8 gm. (0.8 mol) of a mixture of bis-(2-hydroxyalkyl)-sulfides with alkyl radicals of $C_{12}$, $C_{14}$, $C_{16}$ chain length (OH-number [OH+SH]=209.6)

were reacted with 704.0 gm. (16.0 mols) of ethylene oxide in the presence of 2.7 gm. of sodium methylate. The amount of ethylene oxide applied was taken up after 8 hours. The resulting product which contained on an average 20 mols of ethylene oxide per mol of bis-(2-hydroxyalkyl)-sulfide had a sulfur content of 2.3%. The turbidity point of a 1% aqueous solution was approximately 40° C. The product has tensile properties and is especially suited for washing of cotton and polyester fibers.

EXAMPLE 4

Example 1 was repeated with the exception that the amount of ethylene oxide applied was reduced to 42.5 gm. (0.965 mol). To one mol of the reacted bis-(2-hydroxy-n-dodecyl)-sulfide were added an average of 14.6 mols of ethylene oxide. The product contained 3.26% sulfur. The turbidity point of a 1% aqueous solution was 70 to 80° C. The obtained product has tensile properties and has, also in a low bath concentration, a good cleaning action on cotton and wool.

EXAMPLE 5

In a reaction apparatus equipped with agitation, thermometer, dropping funnel and reflux condenser, 80 gm. (0.2 mol) of bis-(2-hydroxy-n-dodecyl)-sulfide were charged and 0.6 gm. of sodium methylate were added. Through the dropping funnel, 116 gm. (2.0 mols) of propylene oxide were added during 8 hours. The reaction temperature was maintained between 110° C. and 130° C. The resulting product had a sulfur content of 3.1% and the turbidity coefficient was 4.1. The product is water insoluble and has emulsifying and foam inhibiting properties.

EXAMPLE 6

Example 5 was repeated with the exception that the amount of added propylene oxide was raised to 20 mols per mol of bis-(2-hydroxy-n-dodecyl)-sulfide. The resulting product had a sulfur content of 1.7% and a turbidity coefficient of 4.6. The substance is water insoluble and has emulsifying and foam inhibiting properties.

EXAMPLE 7

In a procedure according to Example 5, 80 gm. (0.2 mol) of bis-(2-hydroxy-n-dodecyl)-sulfide were reacted with 144 gm. (2.0 mols) of butylene oxide. The amount of butylene oxide applied was taken up after 7 hours. The resulting product which contained on the average 10 mols of butylene oxide per mol of bis-(2-hydroxyl-n-dodecyl)-sulfide had a sulfur content of 2.8% and a turbidity coefficient of 2.2. In addition to its good emulsifying properties it has a very effective foam inhibition action in very strongly foaming tensile solutions.

EXAMPLE 8

In a procedure according to Example 5, 80 gm. (0.2 mol) of bis-(2-hydroxy-n-dodecyl)-sulfide were reacted with 58 gm. of propylene oxide during 4 hours in the presence of 1 gm. of sodium methylate. The resulting product was subsequently reacted with 176 gm. (4.0 mols) of ethylene oxide, in a procedure according to Example 1. The resulting product contained an average of 5 mols of propylene oxide and 20 mols of ethylene oxide per mol of bis-(2 - hydroxy-n-dodecyl)-sulfide. It had a sulfur content of 1.9%. The turbidity point of a 1% aqueous solution was 51°–52° C. The product has tensile properties and is especially suitable for the washing of cotton and polyester fabrics.

The preceding specific embodiments are illustrative of the practice of the invention. It is to be understood, however, that other expedients known to those skilled in the art may be employed without departing from the spirit of the invention.

We claim:
1. Polyalkyleneglycol ethers of bis - (hydroxyalkyl)-sulfides having the formula

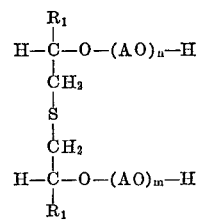

wherein $R_1$ is an alkyl having from 6 to 22 carbon atoms, A is alkylene having from 2 to 4 cabon atoms, $n$ and $m$ represent integers from 0 to 100 with the proviso that the sum of $n$ and $m$ is an integer from 1 to 100.

2. The polyalkylene glycol ethers of claim 1 wherein the sum of $n$ and $m$ is an integer from 5 to 50 and $n$ and $m$ represent integers of from 2 to 30.

3. The polyalkylene glycol ethers of claim 1 wherein A is ethylene.

4. The polyalkylene glycol ethers of claim 1 wherein A is propylene.

References Cited

UNITED STATES PATENTS

| 2,862,972 | 12/1958 | Holtschmidt et al. | 260—609 F |
| 2,898,349 | 8/1959 | Zuppinger et al. | 260—2 EP X |

FOREIGN PATENTS

| 1,484,740 | 1967 | France | 260—609 A |

JOSEPH REBOLD, Primary Examiner

D. R. PHILLIPS, Assistant Examiner

U.S. Cl. X.R.

252—89, 319, 352; 260—609 F